INVENTOR.
RICHARD W. YOUNG
BY
Albert G. Blazejak
ATTORNEY

INVENTOR.
RICHARD W. YOUNG
BY
*Albert G. Blazek*
ATTORNEY

Patented June 26, 1951

2,558,503

UNITED STATES PATENT OFFICE 2,558,503

HANDLING OF ROD BUNDLES OR SIMILAR ANNULI

Richard W. Young, Worcester, Mass., assignor to Morgan Construction Company, Worcester, Mass., a corporation of Massachusetts Application May 26, 1949, Serial No. 95,507

6 Claims. (Cl. 198—25)

This invention relates to the handling of rod bundles or similar annuli, and more particularly to the removal of annular bundles of rolled metal rod or the like from a conveyor.

In rod rolling mills it is the practice to coil the rods while they are at a red heat into annular bundles which are carried along with their axes generally upright on a so-called "coil" conveyor. This conveyor includes an endless chain having projecting dogs which engage the rod bundles and bring about the desired movement thereof. In some mills a storage wheel has been mounted near the discharge end of the conveyor, this wheel having a vertical axis and a series of radially extending horizontal arms on each of which a plurality of the bundles may be suspended. The bundles may be removed in groups in known manner from the arms of the storage wheel by means of a hair-pin hook suspended from a crane, which serves to carry the bundles to a railway car or to a storage bin. The transfer of the bundles from the discharge end of the conveyor to the storage wheel has been carried out by manual labor, with the assistance of hand controlled hooks or the like. This is a crude, laborious and expensive operation.

It is accordingly one object of the invention to provide a simple and dependable mechanism for removing rod bundles or the like from the discharge end of a conveyor without manual labor.

It is a further object of the invention to provide an efficient and reliable apparatus for transferring rod bundles or the like from the discharge end of a coil conveyor to a storage wheel.

It is a further object of the invention to provide a bundle transfer mechanism which will handle the bundles without disarranging the convolutions thereof.

With these and other objects in view, as will be apparent to those skilled in the art, the invention resides in the combination of parts set forth in the specification and covered by the claims appended hereto.

Referring to the drawings illustrating one embodiment of the invention and in which like reference numerals indicate like parts, Fig. 1 is a longitudinal section through an apparatus for handling rod bundles, the section being taken on the line 1—1 of Fig. 2;

Fig. 2 is a plan view of the apparatus;

Figs. 3 to 7 inclusive are fragmentary views similar to a portion of Fig. 1, but showing successive positions for certain of the parts;

Figure 2:
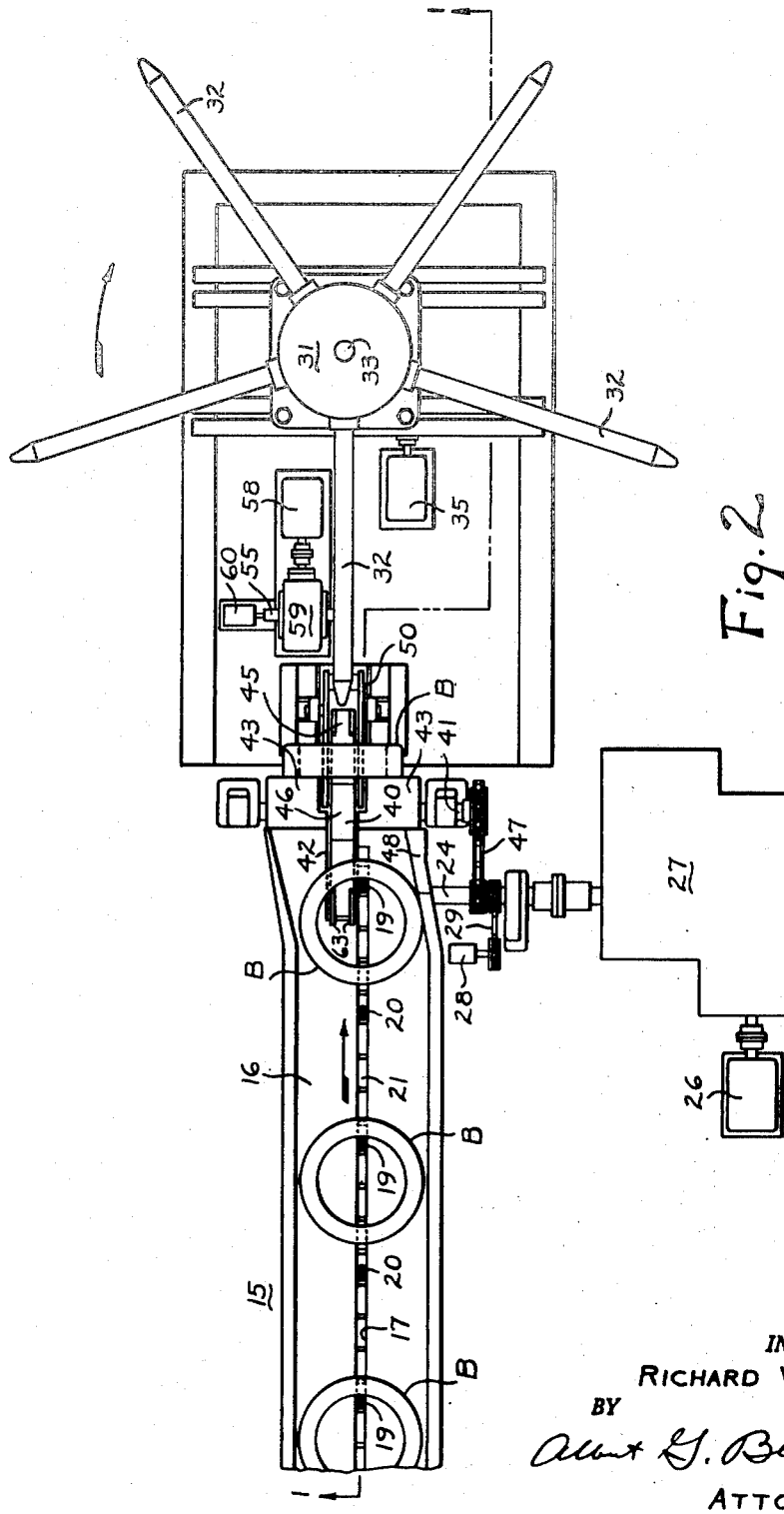

The embodiment illustrated comprises a coil conveyor 15 comprising a flat substantially horizontal plate structure 16 having a central longitudinally extending slot or groove 17 therein. A series of dogs 19 and 20 project upwardly from the slot 17, these dogs being carried by an endless chain 21 which passes downwardly around a sprocket wheel 23 mounted on a transverse horizontal shaft 24 adjacent the discharge end of the conveyor. The dogs 19, which may be called pulling dogs, alternate with the dogs 20. The annular coils or bundles of rod are supported upon the plate structure 16 with the axes of the bundles generally upright and with the dogs 19 extending into the interiors of the bundles, so that as these dogs move forwardly they will engage the bundles and pull them along the plate structure 16. The dogs 20, which may be called pusher dogs, are located between successive bundles, and they come into use only as the pulling dogs 19 pass downwardly around the sprocket wheel 23, as will be explained hereinafter. An electric motor 26 serves to drive the sprocket wheel shaft 24 through a speed reducing gear mechanism enclosed in a casing 27 (Fig. 2). The shaft 24 is arranged to drive a rotary limit switch 28 through a chain-and-sprocket connection 29.

Figure 1:
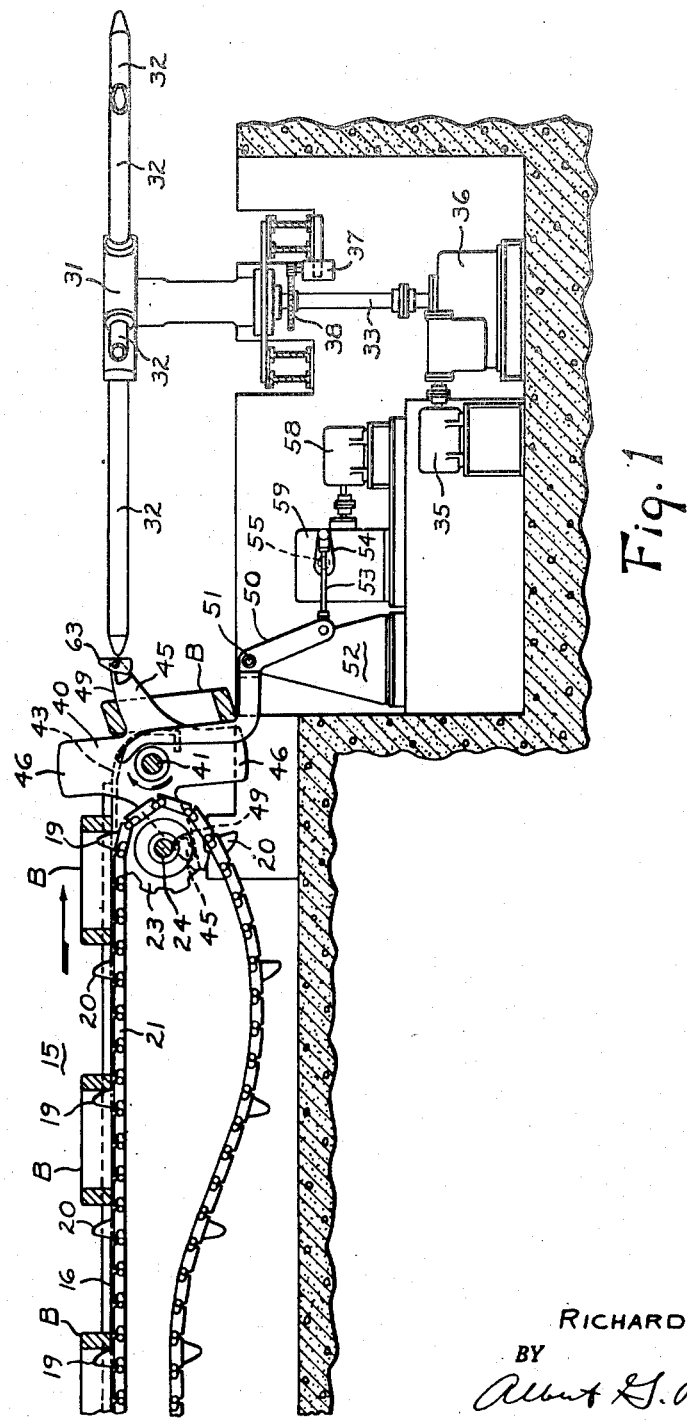

In front of the conveyor 15 there is mounted a rotatable storage wheel 31 with its axis vertical, this wheel having a plurality of radially extending horizontal arms 32 and a vertical driving shaft 33. An electric motor 35 is connected to the shaft 33 through a speed reducing gear mechanism enclosed in a casing 36 (Fig. 1). The shaft 33 is connected to a rotary limit switch 37 by means of gearing 38. These parts are so arranged that the wheel 31 can be turned about its axis intermittently to bring the arms 32 successively into approximate alignment with the conveyor 15 and in position to receive bundles therefrom. Each arm 32 is long enough to receive and support several of the bundles, the arms extending through the interiors of the bundles so that the bundles will be suspended from the arms. In this way the wheel can accommodate a considerable number of bundles, which can be removed from the wheel in known manner by a crane-supported hairpin hook or the like (not shown).

The invention provides a power-actuated mechanism for transferring bundles from the conveyor 15 to the storage wheel 31. For this purpose there is provided a transfer wheel 40 which is mounted upon a transverse horizontal rotatable shaft 41 located immediately in front of the sprocket wheel 23. The upper portion of the wheel 40 extends upwardly through a slot 42 formed in the plate structure 16 at one side of the slot 17. On opposite sides of the wheel 40 there are mounted stationary plates 43 which form continuations of the conveyor plate 16. Each plate 43 is curved downwardly and forwardly in a circular arc coaxial with the wheel 40 to provide a convex cylindrical surface. The wheel 40 is constructed with two diametrically opposed arms 45, which may be called suspending arms, and with two diametrically opposed arms 46, which may be called supporting arms. The arms 45 alternate with the arms 46. The wheel 40 is rotated in the same direction as the sprocket wheel 23 of the coil conveyor 15 and in a fixed speed relationship thereto, this relationship being such that the wheel 40 will make one-half revolution for each dog 19 reaching the sprocket wheel 23. Thus, if the sprocket wheel 23 has eight teeth, and there is a pulling dog 19 on each eighth link of the conveyor chain 21, the wheel 40 will rotate at one-half the speed of the sprocket wheel 23. In order to maintain the desired speed relationship, the shaft 24 of the conveyor is arranged to drive the shaft 41 of the transfer wheel 40 through a chain-and-sprocket connection 47 of the proper ratio (Fig. 2). The length of the suspending arms 45 is such that their outer ends will travel close to the end of any arm 32 of the storage wheel 31 when such arm 32 is aligned with the transfer wheel 40. The arms 45 and 32 do not quite touch one another, however, as a slight clearance is provided.

Figure 3:
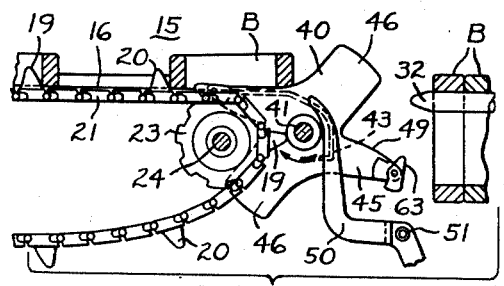
Figure 4:
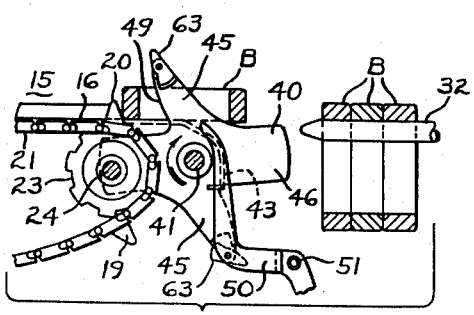

The various parts are so constructed and arranged that each dog 19 will pull a bundle B toward the discharge end of the conveyor 15, as shown in Fig. 1. When a dog 19 moves downwardly around the sprocket wheel 23 and thus is withdrawn from contact with its corresponding bundle, the bundle will remain stationary for a brief interval until the next dog 20 comes along and pushes it forwardly, as shown in Fig. 3. During this movement of the bundle an inclined side rail 48 (Fig. 2) will crowd the bundle laterally into better alignment with the transfer wheel 40. At this time one of the suspending arms 45 will be moving upwardly into the interior of the bundle, and this movement will continue, as shown in Fig. 4. Upon further rotation of the wheel 40 (Fig. 5) the bundle will be tilted forwardly and downwardly, with its front and rear portions resting on the supporting arms 46 and with its lateral portions resting on the curved plates 43. The upwardly projecting suspending arm 45 will prevent the bundle from sliding forwardly and the convolutions thereof from being disarranged. Further rotation of the wheel 40 will bring the parts to the positions shown in Fig. 1, in which the upper or rear surface 49 of the loaded arm 45 is substantially aligned with the storage wheel arm 32 which extends toward the conveyor 15. At this time the conveyor sprocket wheel 23 and the transfer wheel 40 will be stopped, as will be explained later, in order that the bundle may be moved forwardly from the arm 45, on which it is suspended, to the storage wheel arm 32.

In order to move the bundles on to the storage wheel, there is provided a transfer lever 50 which is mounted on a fulcrum pin 51 located below and in front of the axis of the transfer wheel 40. This pin 51 is carried by a bracket 52 (Fig. 1). The upper end of the lever 50 normally lies closely in front of the transfer wheel shaft 41 and is curved upwardly and rearwardly in order to avoid interference with the bundles which are carried by the transfer wheel 40. The upper portion of the lever is preferably bifurcated and straddles the transfer wheel. The lower end of the lever 50, beneath the fulcrum 51, is connected by a link 53 to a crank 54 on a crankshaft 55, the latter being driven by an electric motor 58 through a suitable speed-reducing gear mechanism located in a casing 59. As indicated in Fig. 2, a rotary limit switch 60 is driven from the crankshaft 55. It will be apparent that when the crank makes one revolution from the position shown in Fig. 1, the lever 50 will swing into the position shown in Fig. 7 and then back to the position shown in Fig. 1. This movement of the lever will sweep the bundle from the transfer wheel arm 45 to the storage wheel arm 32.

Figure 6:
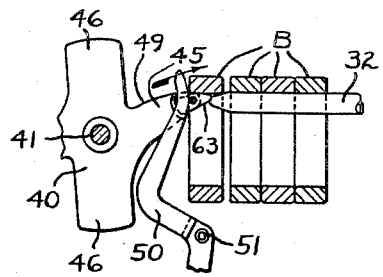
Figure 7:
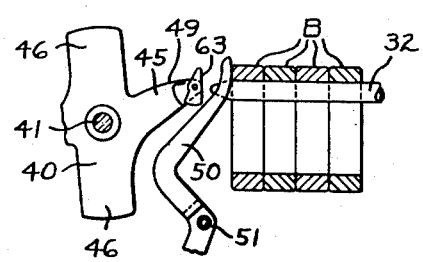

It will be noted from Fig. 1 that the rear surface 49 of each suspending arm 45 is curved in a circular arc. These arcs are so shaped and located that when one of the arms 45 is in its unloading position as shown in Figs. 1, 6 and 7, the center of the corresponding arc will substantially coincide with the center of the pin 51 on which the transfer lever 50 is fulcrumed. Hence, as the lever 50 pushes the bundle along the arcuate surface 49 there will be substantially no relative motion between the lever and the bundle, and the convolutions of the bundle will not be disturbed.

Figure 8:
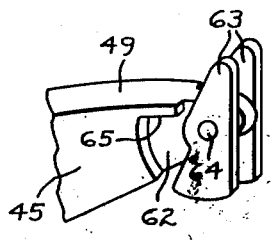
Fig. 8 is a perspective view of a portion of a transfer wheel.

It is important to prevent any of the convolutions of the bundle from dropping into the slight clearance space or gap between the end of the suspending arm 45 and the end of the adjacent storage arm 32. For this reason, means is provided to bridge this gap during the movement of a bundle across the same. As best shown in Fig. 8, the end portion of each arm 45 is formed with a recess 62 on each side to receive an elongated dog 63, the two dogs being secured to the opposite ends of a transverse pin 64 which extends through the end of the arm and is free to turn therein. A rib 65 is formed on the arm behind each recess 62 in position to limit the pivotal movements of the dogs 63 in both directions. The construction of each dog is such that its center of gravity is displaced from the pivot pin 64 in a direction lengthwise of the dog. Thus the heavier ends of the dogs will remain below the pin 64 as the arm 45 approaches its discharge position (Fig. 1). When the transfer lever 50 pushes a bundle from the arm 45 to the arm 32 (Fig. 6) the bundle will engage the upper ends of the dogs 63 and swing them downwardly and forwardly until they straddle the end of the storage arm 32 and bridge the gap between the arms 45 and 32, thus preventing any convolutions of the bundle from dropping into this gap. At this time the heavier ends of the dogs will engage the ribs 65, which will limit the movements of the dogs and enable them to support the weight of the bundle.

The motors 26, 35 and 58 which drive the various parts of the apparatus are provided with suitable electrical controls and interlocks to prevent damage to the mechanism by reason of operation of one or more motors at the wrong time.

Figure 9:
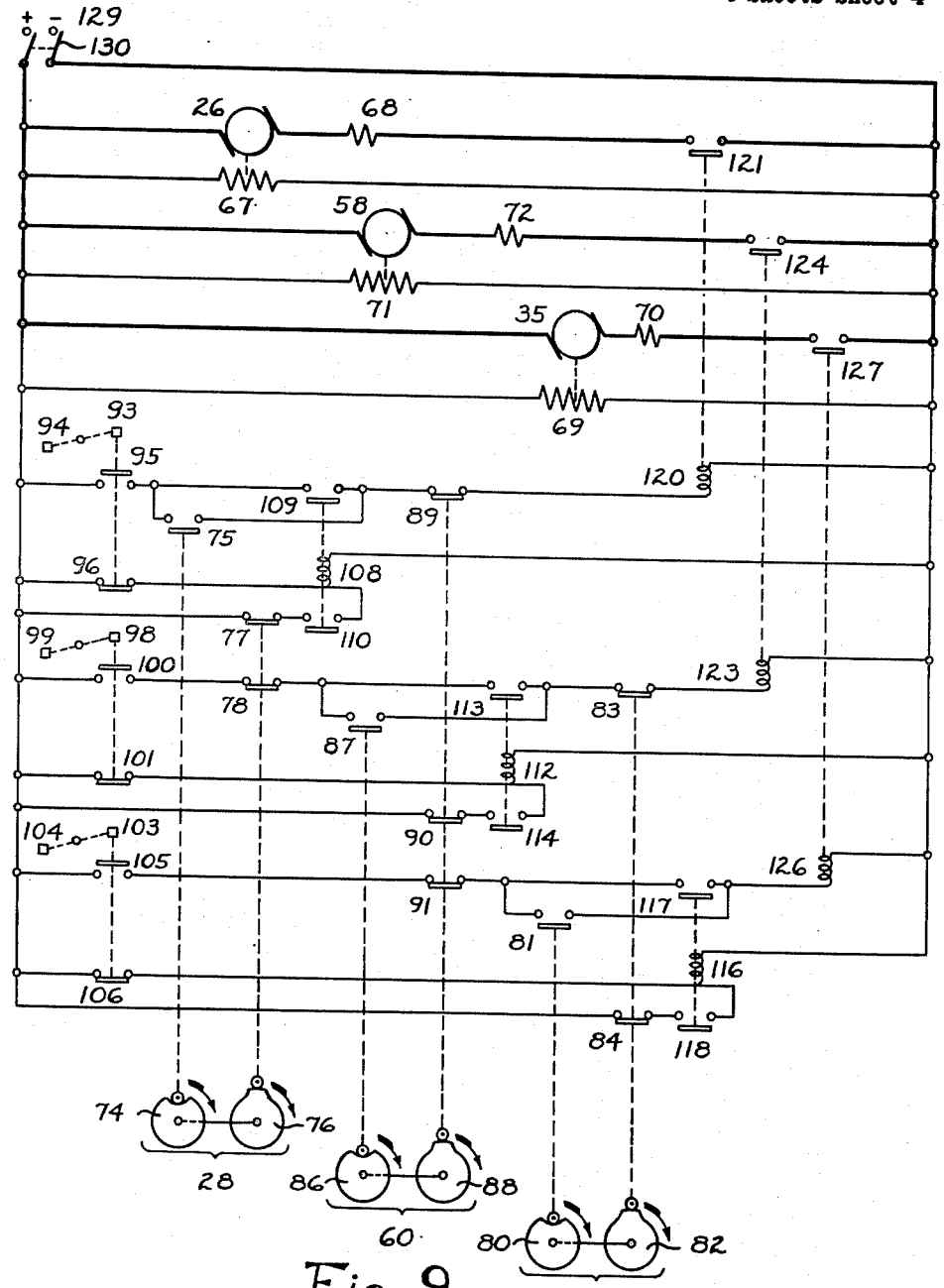
Fig. 9 is an electrical wiring diagram showing the controls for the motors which drive the apparatus.

Referring now to Fig. 9, it will be seen that the motor 26 is provided with a shunt field 67 and a brake-releasing solenoid 68. Similarly, the motor 35 is provided with a shunt field 69 and a brake-releasing solenoid 70, while the motor 58 is provided with a shunt field 71 and a brake-releasing solenoid 72. The rotary limit switch 28 is provided with a cam 74 which controls a switch 75, and with a cam 76 which controls two switches 77 and 78. The rotary limit switch 37 is provided with a cam 80 which controls a switch 81, and with a cam 82 which controls two switches 83 and 84. The rotary limit switch 60 is provided with a cam 86 which controls a switch 87, and with a cam 88 which controls three switches 89, 90 and 91. For controlling the motor 26 there is provided a start button 93 and a stop button 94, these buttons being arranged to actuate two interconnected and oppositely disposed switches 95 and 96. For controlling the motor 58 there is provided a start button 98 and a stop button 99, these buttons being arranged to actuate two interconnected and oppositely disposed switches 100 and 101. Similarly, for controlling the motor 35 there is provided a start button 103 and a stop button 104, these buttons being arranged to actuate two interconnected and oppositely disposed switches 105 and 106. Several magnetic contactors or relays are provided. Thus there is a contactor coil 108 which controls two normally open switches 109 and 110, a contactor coil 112 which controls two normally open switches 113 and 114, and a contactor coil 116 which controls two normally open switches 117 and 118. In addition there is a contactor coil 120 which controls a normally open switch 121, a contactor coil 123 which controls a normally open switch 124, and a contactor coil 126 which controls a normally open switch 127. There is also indicated a suitable supply 129 of electricity, under the control of a main switch 130.

The electrical connections for the various parts as shown in Fig. 9 will now be described. The fields 67, 71 and 69 are each connected across the main switch 130. The following groups of devices are each connected in series across the main switch 130: the motor 26, the solenoid 68, and the switch 121; the motor 58, the solenoid 72, and the switch 124; the motor 35, the solenoid 70, and the switch 127; the switches 95, 109, and 89, and the coil 120; the switch 96 and the coil 108; the switches 100, 78, 113 and 83, and the coil 123; the switch 101 and the coil 112; the switches 105, 91, and 117, and the coil 126; and the switch 106 and the coil 116. The switch 75 is connected across the switch 109. The switches 77 and 110 are connected in series across the switch 96. The switch 87 is connected across the switch 113. The switches 90 and 114 are connected in series across the switch 101. The switch 81 is connected across the switch 117. The switches 84 and 118 are connected in series across the switch 106.

Figure 5:
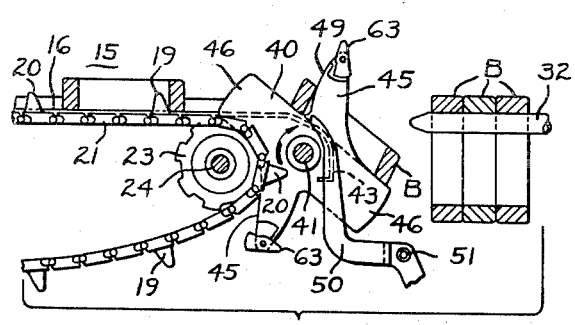

The operation of the invention will now be apparent from the above disclosure. With the main switch 130 closed, the motor fields 67, 69 and 71 will all be energized, and the coil 108 will be energized through the closed switch 96. Hence the switches 109 and 110 will be closed. With the transfer lever 50 in its rest position, the switch 87 will be open and the switch 89 will be closed. The conveyor 15 can then be started by pushing the button 93 to close the switch 95 and open the switch 96. The coil 120 will thus be energized, closing the switch 121, and energizing the conveyor motor 26, which will immediately start. As the conveyor moves ahead, the limit switch cam 74 will close the switch 75, and the limit switch cam 76 will open the switches 77 and 78, deenergizing the coil 108 and opening the switches 109 and 110. The rod bundles will be carried along by the dogs 19, and as a bundle approaches the transfer wheel 40 and the corresponding dog 19 moves downwardly around the sprocket wheel 23 and out of the bundle the following dog 20 will engage the bundle from the rear and push it along as shown in Figs. 3 and 4. By this time one of the arms 45 of the transfer wheel 40 will be moving upwardly into the interior of the bundle, followed by one of the arms 46 which will lift the rear portion of the bundle and tip it forwardly and downwardly as shown in Fig. 5. By the time the loaded arm 45 reaches a position substantially in alignment with one of the storage wheel arms 32, as shown in Fig. 1, the bundle will be hanging from the arm 45 and in a position directly in front of the upper portion of the transfer lever 50. At this time the cam 74 of the limit switch 28, which moves one revolution for one-half a revolution of the transfer wheel 40, will open the switch 75, deenergizing the coil 120, opening the switch 121, and stopping the conveyor motor 26.

The bundle may now be transferred to the storage wheel 31. For this purpose the operator will push the start button 98, closing the switch 100 and opening the switch 101. This will energize the coil 123 and close the switch 124, energizing the transfer motor 58. This will rotate the crank 54 and swing the lever 50 from the position shown in Fig. 2 to that shown in Fig. 7, pushing the bundle from the arm 45 to the arm 32. As the bundle engages the dogs 63, it will tilt them downwardly as shown in Fig. 6 so that they will bridge the gap between the arms and prevent any of the convolutions of the bundle from dropping into the gap. When the bundle has passed over the dogs they will resume their former positions. When the crank 54 has completed one revolution and the transfer lever has returned to its original position, the limit switch 87 will be opened by its cam 86, thereby deenergizing the coil 123, opening the switch 124, and stopping the motor 58. Bundles can be transferred successively from the conveyor 15 to the arm 32 until a desired number of bundles has been placed thereon. Before the conveyor can be started each time it is necessary to push the stop button 94 to close the switch 96 and energize the coil 108, so that the switches 109 and 110 will be closed. Similarly, before the transfer lever 50 can be operated each time it is necessary to push the stop button 99 to close the switch 101 and energize the coil 112, so that the switches 113 and 114 will be closed.

When one of the arms 32 of the storage wheel has been sufficiently loaded, the wheel 31 will be rotated one-fifth of a revolution to bring the next arm 32 into the receiving position. For this purpose the operator will push the start button 103 to thereby close the switch 105 and open the switch 106. This will energize the coil 126 and close the switch 127, thus starting the storage wheel motor 35 and turning the storage wheel 31. By the time the next arm 32 has reached the receiving position, the cams 80 and 82 of the limit switch 37 will have been turned one complete revolution by means of the gearing 38, so that the cam 80 will open the switch 81, deenergize the coil 126, open the switch 127, and stop the storage wheel motor 35. Before the operator can start this motor again, he must push the stop button 104 to open the switch 105 and close the switch 106, thereby energizing the coil 113 and closing the switches 117 and 118.

It will be seen that the various electrical circuits are interlocked in such a manner as to prevent operation of certain parts of the apparatus unless other parts are properly positioned. Thus the conveyor motor 26 cannot be started unless the transfer lever 50 is in its rearmost or rest position close to the transfer wheel shaft 41, for whenever the lever 50 is away from this position the cam 88 of the limit switch 60 will open the switch 89 and prevent energization of the coil 120. Similarly, the motor 58 which actuates the transfer lever 50 cannot be started unless the transfer wheel 40 is in the proper discharge position and one of the storage wheel arms 32 is in the proper receiving position. If the wheel 40 is not in its discharge position, the cam 76 of the limit switch 28 will open the switch 78, preventing energization of the coil 123. If an arm 32 is not in its receiving position, the cam 82 of the limit switch 37 will open the switch 83, likewise preventing energization of the coil 123. Also, the motor 35 which drives the storage wheel 31 cannot be started unless the transfer lever 50 is in its rest position, for otherwise the cam 88 of the limit switch 60 will open the switch 91 and prevent energization of the coil 126. These various interlocks prevent damage by reason of possible carelessness on the part of the operator.

Certain features in connection with the construction and arrangement of the transfer wheel 40 are described and claimed in the prior application of Richard W. Young et al., Serial No. 88,712, filed April 21, 1949.

Having thus described my invention, what I claim as new and desire to secure by Letters Patent is:

1. Apparatus for handling rod bundles or similar annuli comprising a conveyor arranged to move bundles forwardly with their axes generally upright, a storage wheel located in front of the conveyor and rotatable about a substantially vertical axis, the storage wheel having a plurality of generally radial arms thereon arranged to be moved successively into approximate alignment with the conveyor, a transfer wheel located between the conveyor and the storage wheel, the transfer wheel being rotatable about a substantially horizontal axis extending transversely of the conveyor, means to rotate the transfer wheel so that its upper portion will travel forwardly toward the storage wheel, the transfer wheel being shaped to provide a suspending arm arranged to move upwardly into the interior of a bundle delivered by the conveyor and to swing the bundle forwardly and downwardly until the bundle is suspended from the arm and the arm is substantially aligned with one of the arms of the storage wheel, and a transfer lever mounted on a fulcrum located below and in front of the transfer wheel axis, the upper portion of the lever serving to engage the upper portion of the bundle from the rear and to slide the bundle forwardly along the suspending arm of the transfer wheel on to the aligned storage wheel arm.

2. Apparatus as set forth in claim 1, in which the rear surface of the suspending arm is curved substantially in an arc of a circle having its center adjacent the transfer lever fulcrum when the suspending arm is in the position for transfer of a bundle therefrom.

3. Apparatus as set forth in claim 1, in which a clearance space is provided between the end of the suspending arm of the transfer wheel and the end of the adjacent arm of the storage wheel, and a dog is movably mounted on the end portion of the suspending arm and so arranged that during the transfer of the bundle the dog will bridge the said space and prevent any portion of the bundle from entering the said space.

4. Apparatus as set forth in claim 1, in which a clearance space is provided between the end of the suspending arm of the transfer wheel and the end of the adjacent arm of the storage wheel, and a dog is pivotally mounted on the end portion of the suspending arm and arranged to be swung forwardly and downwardly by the bundle, as the bundle is being transferred, so that the dog will bridge the said space and prevent any portion of the bundle from entering the said space, the dog being biased toward a rearward position out of the path of the storage wheel arms.

5. Apparatus as set forth in claim 1, in which a clearance space is provided between the end of the suspending arm of the transfer wheel and the end of the adjacent arm of the storage wheel, and two dogs are pivotally mounted on the end portion of the suspending arm in laterally spaced relation and arranged to be swung forwardly and downwardly by the bundle, as the bundle is being transferred, so that the dogs will straddle the end portion of the storage wheel arm and bridge the said space to prevent any portion of the bundle from entering the said space, the dogs being biased toward rearward positions out of the path of the storage wheel arms.

6. Apparatus for handling rod bundles or similar annuli comprising a sprocket wheel rotatable about a horizontal axis, an endless chain extending around the sprocket wheel and having a substantially horizontal upper portion which travels toward the sprocket wheel as the latter rotates, the chain having dogs along its length, the dogs on the upper portion of the chain engaging the bundles to move the same forwardly along with the chain with the axes of the bundles upright until the bundles are above the sprocket wheel, a transfer wheel rotatable about an axis parallel with the axis of the sprocket wheel, the axis of the transfer wheel being spaced forwardly from the axis of the sprocket wheel, means to rotate the sprocket wheel and the transfer wheel simultaneously and intermittently in the same direction, the transfer wheel including an arm arranged to move upwardly into the central opening of a bundle as the bundle arrives above the sprocket wheel, the transfer wheel serving to swing the bundle forwardly and downwardly until the bundle is suspended from the arm, a storage wheel located in front of the transfer wheel and rotatable intermittently about a substantially vertical axis, the storage wheel having a plurality of generally radial arms thereon arranged to be moved successively into approximate alignment with the transfer wheel, and a transfer lever mounted on a fulcrum located below and in front of the transfer wheel axis, the upper portion of the lever serving to engage the upper portion of the bundle from the rear and to slide the bundle forwardly along the suspending arm of the transfer wheel on to the aligned storage wheel arm.

RICHARD W. YOUNG.

REFERENCES CITED

The following references are of record in the file of this patent:

UNITED STATES PATENTS

| Number | Name | Date |
| --- | --- | --- |
| 2,024,513 | Diescher | Dec. 17, 1935 |
| 2,301,747 | Peterson | Nov. 10, 1942 |